United States Patent [19]

Kondo

[11] 4,244,515

[45] Jan. 13, 1981

[54] PRESET COUNTER

[75] Inventor: Hiroatu Kondo, Osaka, Japan

[73] Assignee: Hokuyo Automatic Co., Ltd., Osaka, Japan

[21] Appl. No.: 48,378

[22] Filed: Jun. 14, 1979

[30] Foreign Application Priority Data

Aug. 2, 1978 [JP] Japan .......................... 53/106956[U]

[51] Int. Cl.³ ............................................... G06F 15/18

[52] U.S. Cl. ............................ 235/132 R; 235/132 E; 235/133 R; 235/144 HC

[58] Field of Search ........... 235/132 A, 132 E, 132 R, 235/61 A, 1 C, 1 R, 133 R, 144 HC

[56] References Cited

U.S. PATENT DOCUMENTS

| | | | |
|---|---|---|---|
| 2,524,755 | 10/1950 | Bliss | 235/1 R |
| 3,244,368 | 4/1966 | Juhas | 235/132 R |
| 3,343,789 | 9/1967 | Wales, Jr. et al. | 235/132 R |

*Primary Examiner*—George H. Miller, Jr.
*Assistant Examiner*—Benjamin R. Fuller
*Attorney, Agent, or Firm*—Armstrong, Nikaido, Marmelstein & Kubovcik

[57] ABSTRACT

A preset counter has a case and one or more counter units. Each counter unit has a number wheel, a first intermediate wheel in mesh with the number wheel, a preset wheel and a second intermediate wheel in mesh with the preset wheel. Said first intermediate wheel comprises a first wheel which is in mesh with said number wheel and whose rotation is prevented releasably by a locking means and a second wheel which is disposed in opposed relationship with said second intermediate wheel, resiliently connected through a clutch to said first wheel and is formed with a recess or notch cut into the peripheral surface thereof. When the preset wheel is rotated, its movement is transmitted through said second intermediate wheel to said second wheel, but not to said first wheel. When the number wheel is rotated, its movement is transmitted through said first wheel to said second wheel, but not to said second intermediate wheel. In each counter unit, when said notch and a contact roller are in line with each other, contacts are actuated. During the counting, a preset reading may be changed. A preset reading remains displayed on the preset wheels until the preset reading is reached.

6 Claims, 8 Drawing Figures

PRESET COUNTER

BACKGROUND OF THE INVENTION

1. Field of the Invention

The present invention relates to a preset counter and more particularly a preset counter wherein a preset reading may be changed by changing the relative position between a number wheel and a preset wheel.

2. Brief Description of the Prior Art

In general the prior art preset counter has one or more pairs of number and preset wheels which are in mesh with each other for rotation in unison with each other. In presetting a desired reading, first the number wheels are reset and are disengaged from the preset wheels so as to change the relative position between each pair of number and preset wheels, thereby changing a previously preset reading to a new one. During the counting, the preset wheels are rotated in unison with their associated number wheels, but since the preset wheels are not interconnected to each other, there is no correspondence between a reading on the number wheels and a reading on the preset wheels. That is, as a reading on the number wheels increments or decrements, a reading on the preset wheels will not follow the number wheels. In other words, a preset reading will not be displayed on the preset wheels during the counting and may be displayed again only when the number wheels are reset to zero. Furthermore the prior art preset counter is disadvantageous in that extremely complicated steps are required for changing a preset reading to a desired one once the counting has been started.

SUMMARY OF THE INVENTION

The present invention was made to overcome the above and other problems encountered in the prior art preset counters. Accordingly, one of the objects of the present invention is to provide a preset counter wherein a preset reading may be correctly and easily changed to a desired one even during the counting.

Another object of the present invention is to provide a preset counter which may maintain the display of a preset reading on the preset wheels even during the counting unless it is changed.

A further object of the present invention is to provide a preset counter wherein a desired reading may be preset or a preset reading may be changed to a desired reading even during the counting operations be such very simple steps as opening a front cover and manipulating the preset wheels.

To the above and other ends, briefly stated, the present invention provides a preset counter comprising a casing, and one or more counter units, each counter unit having a number wheel, a first intermediate wheel in mesh with said number wheel, a preset wheel, a second intermediate wheel in mesh with said preset wheel, locking means, and a contact mechanism having a contact roller or a count-stop means, said first intermediate wheel comprising a first wheel which is in engagement with said number wheel and whose rotation may be releasably arrested by said locking means and a second wheel which is disposed in opposed relationship with said second intermediate wheel and is resiliently connected through clutch means to said first wheel and formed with a notch, said second wheel being forcibly rotated when said first wheel is prevented from being rotated, and arresting means for arresting said second intermediate wheel at a predetermined angular position and in the braked state when said second intermediate wheel remains stationary, said second wheel being rotated by the rotation of said second intermediate wheel but the rotation of said second wheel causing no rotation of said second intermediate wheel, each of said counter units being so arranged that when said notch and said contact roller are in line with each other, contacts are actuated so as to generate the signal which is transmitted to the exterior.

When a desired reading is preset or a preset reading is changed to a new one during the counting operations, an operator first opens a front cover so as to actuate locking means which in turn arrests a first wheel of a first intermediate wheel, thereby preventing the rotation thereof. Thereafter the operator rotates the preset wheels in either direction so as to preset a desired reading or to change a preset reading to a new reading. When the preset wheels are manipulated in this way, a second wheel of the first intermediate wheel is rotated through an angle corresponding to the angle of rotation of the associated preset wheel even when the associated first wheel is arrested against the rotation because the second wheel and the first wheel are connected to each other resiliently through a clutch. As the angular position of the second wheel is changed, a notch thereof is angularly displaced accordingly so that a position at which contacts are actuated may be changed. The number wheels positively keep counting until a preset reading is reached. Furthermore according to the present invention the second intermediate wheel is not driven by the first intermediate wheel so that a preset reading may be kept displayed. Thus the operations of the preset counter may be remarkably facilitated.

The preset counter in accordance with the present invention is very simple in construction. In addition, a desired reading may be preset or a preset reading may be changed to a desired reading even during the counting operations by such simple steps as first opening a front cover and then manipulating the preset wheels. Thus a desired reading may be always preset correctly and easily, whereby efficient operations of the counter may be ensured.

DESCRIPTION OF THE PREFERRED EMBODIMENT

Figure 1:
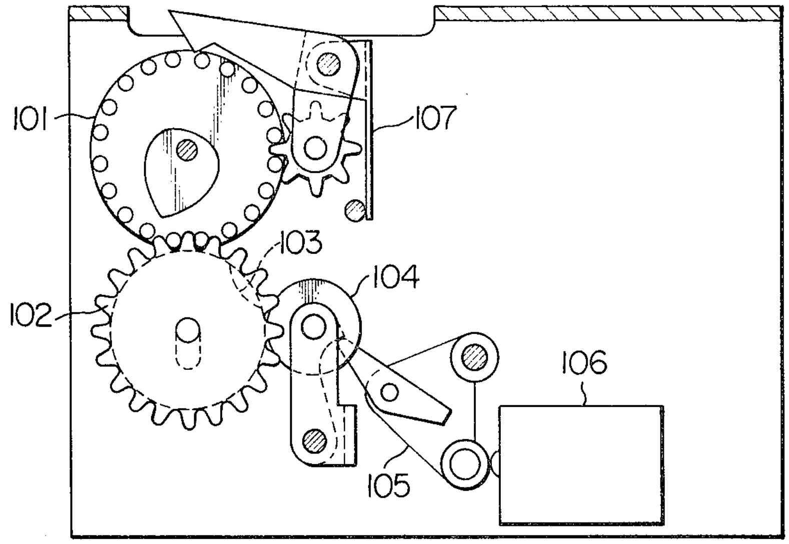
FIG. 1 PRIOR ART
FIG. 1 is a schematic side view of a prior art preset counter.

Prior Art, FIG. 1

Prior to the description of a preferred embodiment of the present invention, a prior art preset counter will be briefly described with reference to FIG. 1 in order to more specifically point out its problems. A number wheel 101 is geared to a preset wheel 102 for rotation in unison therewith during counting operations. As is the case with the number wheel 101, the preset wheel 102 has decimal numbers from 0 to 9 marked around the peripheral face thereof and is formed with an engaging or microswitch actuating notch 103. A n-stage preset counter therefore consists of n pairs of the number and preset wheels 101 and 102 connected in such a way that when 9 is reached at a given stage, a carry is generated and counted into the next higher stage. As the preset wheel 102 at a given stage is rotated, a contact roller 104 drops into the notch 103 so that the displacement of the contact roller 104 may be transmitted through a catch lever 105 so as to turn on or off a microswitch 106. When all the microswitches 106 in all stages are turned on or off in the manner described above, the counting operation is stopped. Thereafter the preset counter is reset to zero by means of a reset device 107. The prior art preset counter of the type described above has some problems as mentioned above.

The Invention, FIGS. 2–6

The present invention was made in order to overcome the above and other problems encountered in the prior art preset counter.

Figure 2:
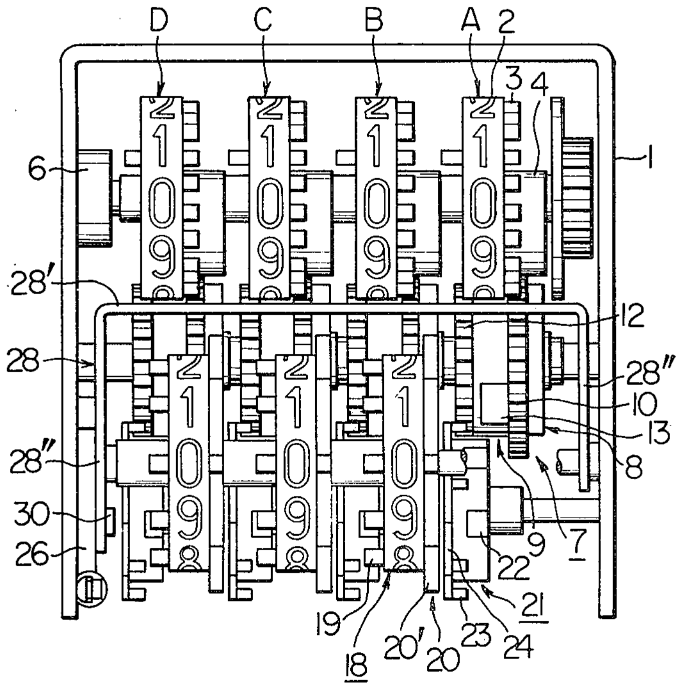
FIG. 2 is a front view of a preferred embodiment of a preset counter in accordance with the present invention, the interior of the preset counter being shown with a cover removed.
Figure 3:
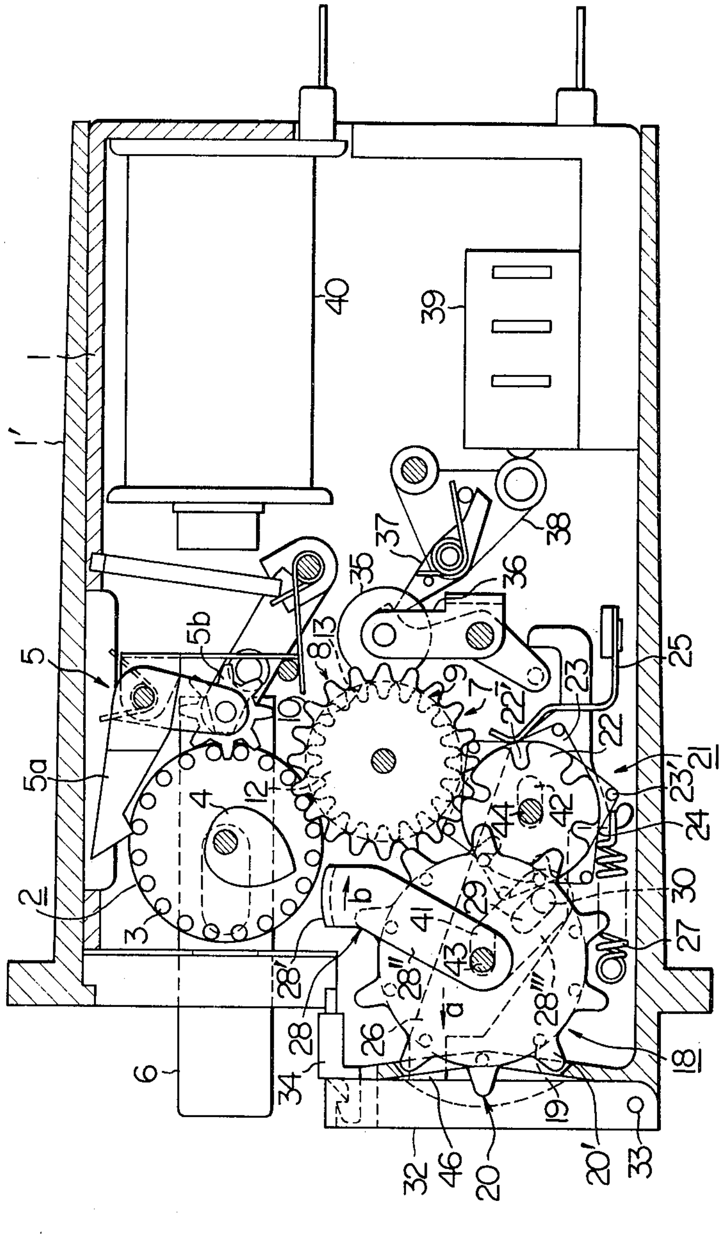
FIG. 3 is a side view thereof with a side wall removed, the counter being in the counting mode.

Referring first to FIGS. 2 and 3, a preset counter in accordance with the present invention is shown as having four stages A, B, C and D enclosed within the space defined by a case 1 and a cover 1'. A number wheel 2 at each stage is loosely carried on a common shaft and is formed integrally with a pin gear 3 having 20 pins extended from one side face thereof, a heart-shaped reset-to-zero cam 4 also on one side thereof and a double-tooth (not shown) extended from the other side face thereof. The four such number wheels as described above are connected in such a way that when 9 is reached at a given stage, a carry is generated and counted into the next higher stage as well-known in the art.

A preset counter further includes a reset-to-zero mechanism 5 of the conventional type consisting of a lever 5*a* which is engageable with the heart-shaped cam 4 and a gear 5*b* in mesh with the pin gear 3. The reset-to-zero mechanism 5 at each stage of the type described is operatively connected to a reset button 6 and a solenoid 40 in such a way that when the reset button 6 is pushed, all the number wheels 2 may be concurrently returned to their zero positions as is well-known in the art.

Figure 5:
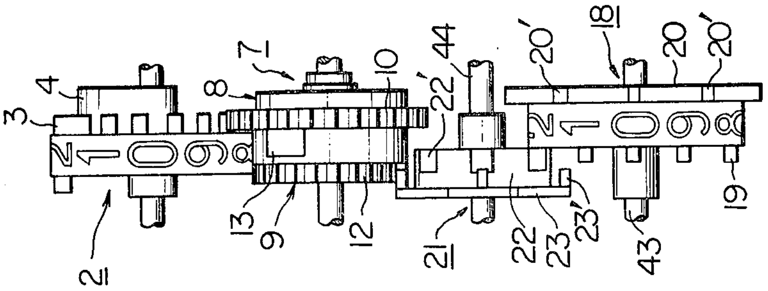
FIG. 5 is a front view illustrating the structural relationship between the component parts or wheels whose shafts are shown as lying in the same plane for the sake of simplicity in illustration.

As best shown in FIG. 5, the number wheel 2 at each stage is connected through a first intermediate wheel 7 and a second intermediate wheel 21 to a preset wheel 18 in contrast to the prior art preset counter of the type shown in FIG. 1 wherein the number and preset wheels 101 and 102 are directly geared together.

Figure 6A:
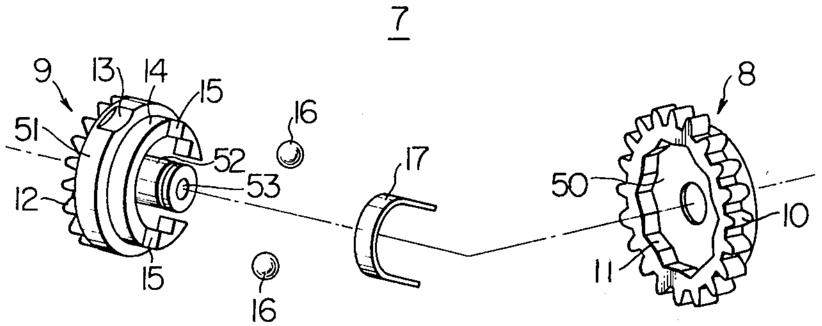
FIG. 6*a* is an exploded perspective view of a first intermediate wheel.

Referring to FIGS. 5 and 6, the first intermediate wheel 7 will be first described. In general, it consists of a first wheel 8 and a second wheel 9. The first wheel 8 has 20 externally threaded gear teeth 10 as best shown in FIG. 6*a* and a recess 50 cut into one side face thereof coaxially therewith having the periphery consisting of ten equiangularly spaced apart V-shaped teeth 11 which are internally threaded.

The second wheel 9 consists in general a large diameter section 51 and a small diameter section 14. The large diameter section 51 has 20 externally threaded gear teeth 12 and one notch 13 cut into the peripheral surface thereof. The small diameter section 14, which will be also referred to as "the boss" in this specification is adapted to be fitted into the side face recess 50 of the first wheel 8 and is formed with two diametrically opposite slots 15. Steel balls 16 are fitted into the slots 15, respectively, and a U-shaped leaf spring 17 is loaded in a partly annular space defined between the boss 14 and a cylindrical projection 52 having a shaft bore 53 in such a way that the leaf spring 17 may normally bias the steel balls 16 radially outwardly as best shown in FIG. 6*b*.

Figure 6B:
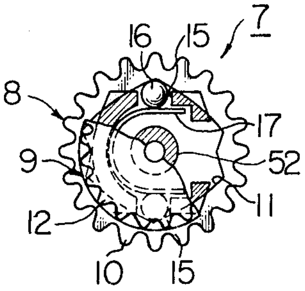
FIG. 6*b* is a side view, partly broken away, thereof.
Figure 6C:
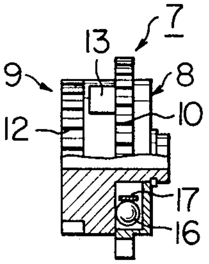
FIG. 6*c* is a front view with a lower half broken away thereof.

Therefore when the first and second wheels 8 and 9 are assembled as best shown in FIGS. 6*b* and 6*c*, the steel balls 16 are pressed against the sloping tooth faces of the V-shaped teeth 11 under the force of the spring 17. Thus the first and second wheels 8 and 9 constitutes a sort of clutch in which they may be rotated not only in either direction with respect to each other but also in unison with each other. More specifically, when no external force is acting to maintain stationary either of the first and second wheels 8 and 9, they may rotate about a shaft in unison with each other. On the other hand, when for instance the first wheel 8 is maintained stationary while the second wheel 9 is forced to rotate with respect to the first wheel 8, the steel balls 16 are forced to move radially inwardly against the bias spring 17 as they are forced to ride along the upgrade tooth faces of the teeth 11 but when they pass past the crests of the teeth 11, they are again forced to press against the tooth faces under the force of the bias spring 17. Repeating this step as many times as desired, the second wheel 9 may be rotated through a desired angle relative to the first wheel 8. Same is true when the second wheel 9 is held stationary while the first wheel 8 is forced to rotate with respect to the second wheel 9.

The first intermediate wheel 7 with the construction described above is interposed between the number wheel 2 and the second intermediate wheel 21 at each stage with the gear 10 of the first wheel 8 in mesh with the pin gear 3 of the number wheel 2 and the second wheel 9 in mesh with a pin gear 23 of the second intermediate wheel 21 to be described in detail below.

Next referring to FIGS. 3 and 5, the preset wheel generally indicated by the reference numeral 18 will be described in detail below. The preset wheel 18 which is loosely carried on a shaft 43 has numbers from 0 to 9 marked equiangularly along the peripheral face thereof and is formed integrally on one side face thereof with an operating or selection wheel 20 having 10 equiangularly-spaced radially outwardly extended tooth-like projections 20' and on the other side face a pin gear 19 having ten pins.

Still referring to FIGS. 3 and 5, the second intermediate wheel generally indicated by the reference numeral 21 and interposed between the first intermediate wheel 7 and the preset wheel 18 is loosely carried on a shaft 44 and consists of a pin gear 23 having six pins 23' for intermittent engagement with the teeth 12 of the second wheel 9 of the first intermediate wheel 7 and a wheel 22 which is very similar in shape to the so-called Geneva wheel and has six equiangularly-spaced slots 22' for engagement with the pin gear 19 of the preset wheel 18. The pin gear 23 is hexagonally shaped with the pins 23' at the vertexes, respectively, and the adjacent vertexes are connected with V-shaped sides or hollows 24. An arresting spring 25 is disposed in such a way that the V-shaped free end 54 thereof may be pressed against the V-shaped side 24 of the pin gear 23 under the snapping action of the spring 25, whereby the pin gear 23 may be maintained at a desired angular position. However the pin gear 23 may be rotated to any desired angular position against the resilient force of the arresting spring 25. That is, when the pin gear 23 is forced to rotate, the V-shaped side 24 gradually forces the arresting spring 25 to spring back, and when the V-shaped free end 54 of the arresting spring 25 passes past the vertex, it is again forced against the V-shaped side 24 under the force of the arresting spring 25. Repeating this step, the pin gear 23 may be intermittently rotated.

The pin gear 23 with six pins 23' is engageable with the second wheel 9 with 20 teeth 12 of the first intermediate wheel 7. Because of their difference in their tooth profile, they intermittently engage with each other. Furthermore the pin gear 23 is so angularly positioned relative to the second wheel 9 that when the rotation of the pin gear 23 is arrested by the arresting spring 25 which is pressed against the V-shaped hollow side 24 of the pin gear 23 as described above, no pin 23' of the pin gear 23 is in mesh with the teeth 12 of the second wheel 9. That is, when the pin gear 23 is at the arrested position, its pins 23' are moved away from the path of the teeth 12 of the second wheel 9. Therefore it follows that when the second intermediate wheel 21 is rotated, the pin gear 23 thereof is also rotated so as to engage with the second wheel 9, thereby rotating the same. On the other hand, when the second wheel 9 of the first intermediate wheel 7 is rotated, its teeth 12 cannot mesh with the pins 23' of the pin gear 23 and consequently the second intermediate wheel 21 will not be rotated.

The wheel 22 of the second intermediate wheel 21 engages with the pin gear 19 of the preset wheel 18 so that when the pin gear 23 of the second intermediate wheel 21 is rotated to a given angular position in the manner described above, the preset wheel 18 is also rotated to a corresponding angular position and a corresponding number appears through a display window or the like.

Referring back to FIGS. 2 and 3, a slide plate 26 is interposed between the leftside wall of the case 1 and the highest order stage or the most-significant-digit stage D as best shown in FIG. 2. As indicated by the dotted lines in FIG. 3, the slide plate 26 has two elongated slots 41 and 42 into which are slidably fitted the shaft 43 of the preset wheel 18 and the shaft 44 of the second intermediate wheel 21, respectively. A bias spring 27 is loaded between the case 1 and the slide plate 26 so that the slide plate 26 may be normally biased in one direction indicated by the arrow a or to the left in FIG. 3. The slide plate 26 may be moved in the direction opposite to the arrow a against the bias spring 27 along the shafts 43 and 44 which serve as guides as will be described immediately below.

Still referring to FIGS. 2 and 3, the preset counter of the present invention further includes a U-shaped locking member 28 consisting of a horizontal locking arm 28' extending in front of the first intermediate wheels 7 in all stages, a right and left legs 28'' carried by the shaft 43 of the preset wheel 18. An extension 28''' is projected slantly downwardly from the lower end of the left leg 28'' of the locking member 28. An elongated slot 29 is formed in the extension 28''' adjacent to the lower end thereof and is loosely fitted over a pin 30 extended from the slide plate 26.

Figure 4:
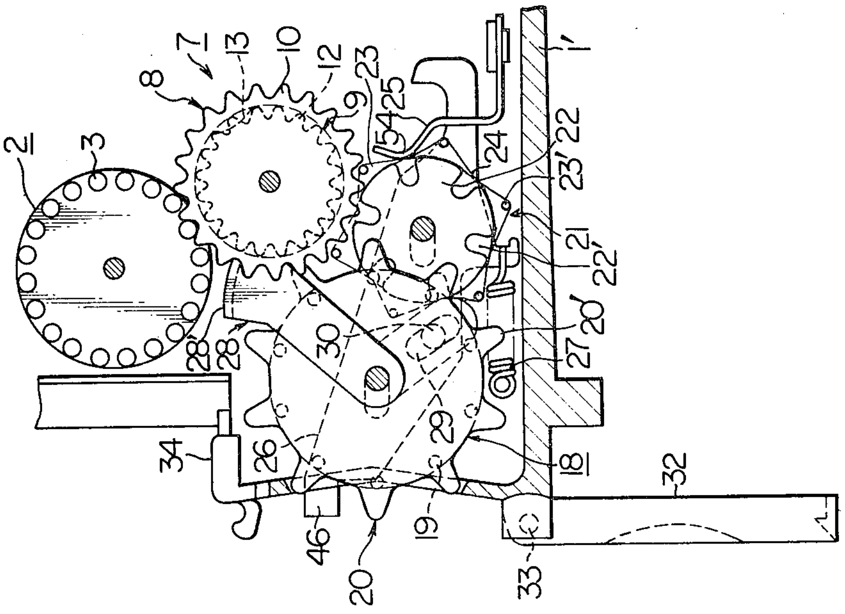
FIG. 4 is a view similar to FIG. 3, but the counter is in the presetting mode.

When the slide plate 26 is shifted to the direction indicated by the arrow a or to the left in FIG. 3, the locking member 28 is caused to rotate about the shaft 43 in the clockwise direction indicated by the arrow b so that the horizontal locking or arresting arm 28' is made into engagement with the teeth 10 of the first wheel 8 of the intermediate wheel 7 as indicated in FIG. 4 and consequently the rotation of the first wheel 8 at each stage may be arrested.

A cover 32 made of a transparent material so as to permit the reading of the numbers displayed by the preset wheels 18 is pivoted to the case 1 with pivot pins 33 and is provided with a catch button or locking means 34 which maintains the cover 32 in the closed position. When the catch button 34 is released, the cover 32 is opened; that is, it is swung away from the case 1 about the pivot pins 33 in the counterclockwise direction in FIG. 3 so that the slide plate 26 which is normally biased toward the left under the force of the spring 27 is shifted to the left and its outer end 46 is extended out of the case 1 as shown in FIG. 4. When the cover 32 is closed, it forcibly pushes the outer end 46 of the slide plate 26 to the right or in the direction opposite to that indicated by the arrow a. Consequently the locking member 28 is caused to rotate in the counterclockwise direction opposite to that indicated by the arrow b so that the horizontal locking or arresting arm 28' of the locking member 28 may be released away from the teeth 10 of the first wheel 8 of the first intermediate wheel 7 and the bias spring 27 is extended as shown in FIG. 3.

Still referring to FIG. 3, a contact roller 35 is pivoted to one end of an arm 36 the other end of which is suitably pivoted and which is operatively connected through a catch pawl or a connecting lever 37 to a catch lever or an actuating lever 38. A bias spring is loaded between the levers 37 and 38 in such a way that the contact roller 35 may be normally pressed against the peripheral face of the second wheel 9 which is formed with the notch 13 (See FIG. 6*a*). As the second wheel 9 rotates, the roller 35 drops into the notch 13 so that the angular movement of the contact roller 35 is transmitted through the arm 36 and the levers 37 and 38, whereby the microswitch 39 is actuated. In summary, when the notch 13 of the second wheel 9 of the first intermediate wheel 7 reaches a predetermined angular position, the microswitch 39 is abled or disabled.

Next the mode of operation of the preset counter with the aforementioned construction will be described with reference to FIGS. 3, 4 and 5. In order to preset a desired reading, an operator releases the locking means 34 so as to open the cover 32 as shown in FIG. 4. Then, as described above, the slide plate 26 is forced to move to the left in FIG. 3 under the force of the bias spring 27 which is now permitted to contract itself so that the locking member 28 is caused to rotate in the clockwise direction; that is, the direction indicated by the arrow b and consequently the horizontal arresting or locking arm 28' engages with the teeth 10 of the second wheel 8 of the first intermediate wheel 7 as shown in FIG. 4, thereby preventing the rotation of all second wheels 8.

When the operator pushes with his or her finger the tooth-like projection 20' of the operating or selection wheel 20 of the preset wheel 18 so as to rotate the same in either direction, one push results in 1/10 of one turn or revolution because of the snapping action of the arresting spring 25; that is, the engagement of the V-shaped free end 54 of the arresting spring 25 with the corresponding V-shaped hollow 24 of the pin gear 23 every time when the pin gear 23 makes a 1/6 of a turn. The operator keeps pushing the tooth-like projections 20' of the operating or selection wheel 20 until a desired number appears at the presetting position. The operator may preset a desired reading by repeating the above cycles at respective stages A–D.

The rotation of the preset wheel 18 is then transmitted through the second intermediate wheel 21 to the second wheel 9 of the first intermediate wheel 7 in the manner described above. As a result the second wheel 9 of the first intermediate wheel 7 is caused to rotate through an angle which is proportional to the angle of rotation of the preset wheel 18. However the rotation of the second wheel 9 will not be transmitted to the first wheel 8 of the first intermediate wheel 7 because the first wheel 8 is kept arrested by the horizontal arresting or locking arm 28' of the locking member 28 as described above and the second wheel 9 may be freely rotated in either direction with respect to the first wheel 8 as described above. As a result, the relative angular position between the first and second wheels 8 and 9 of the first intermediate wheel 7 may be changed by an angle which is proportional to the angle of rotation of the corresponding preset wheel 18. Since the first wheel 8 is arrested as described above, the pin gear 3 of the number wheel 2 which is in mesh with the first wheel 8 will not be rotated when the preset wheel 18 is rotated to preset a desired number on it.

After a desired reading has been preset in the manner described above, the cover 32 is closed as shown in FIG. 3. Then the slide plate 26 is pushed to the right or in the direction opposite to that indicated by the arrow a so that the locking member 28 is caused to rotate in the counterclockwise direction or in the direction opposite to that indicated by the arrow b and consequently the horizontal locking or arresting arm 28' is released away from the teeth 10 of the first wheel 8 of the first intermediate wheel 7. The arresting spring 25 presses the V-shaped hollow side 24 of the pin gear 23 of the second intermediate wheel 21, thereby arresting the pin gear 23 in the position wherein the pins 23' of the pin gear 23 are out of mesh with the teeth 12 of the second wheel 9 of the first intermediate wheel 7.

When the preset counter thus set starts counting, the number wheel 2 is rotated. The rotation of the number wheel 2 is transmitted to the first intermediate wheel 7 through the pin gear 3 which is in mesh with the first wheel 8. Since neither of the first and second wheels 8 and 9 are arrested and because they are coupled to each other through the clutch mechanism described above with reference to FIGS. *6a*, *6b* and *6c*, they are rotated in unison with each other. The rotation of the first intermediate wheel 7 is, however, not transmitted to the second intermediate wheel 21 because the pin gear 23 of the latter is arrested by the arresting spring 25 in the position wherein the pins 23' are out of mesh with the teeth 12 of the second wheel 9 of the first intermediate wheel 7 as described above. As a result, the reading preset on the preset wheels 18 remains unchanged. When the contact roller 35 drops into the notch 13 of the first intermediate wheel 7, the microswitch 39 is actuated in the manner described above.

Next the method for incrementing or decrementing a desired reading during the counting operations will be described. First the front cover 32 is opened as in the case of presetting a desired reading so as to arrest the first wheel 8 of the first intermediate wheel 7 by the locking member 28. Since the first wheel 8 is in mesh with the pin gear 3 of the number wheel 2, the latter is also arrested. Thereafter the operating or selection wheel 20 is rotated in either direction so as to increment or decrement the preset number to a desired number. The rotation of the preset wheel 18 is transmitted to the second wheel 9 of the first intermediate wheel 7 in the manner described above so that the angular position of the notch 13 relative to the first wheel 8 may be varied accordingly. That is, the angular position of the notch 13 is displaced in either direction by an angle corresponding to the increment or decrement set on the preset wheel 18. Thereafter the front cover 32 is closed and the counting operation may be resumed. The incremented or decremented reading remains on the preset wheels 18.

So far a desired reading may be preset or incremented or decremented by pushing the operating wheels 20 having tooth-shaped projections 20' as with a digital switch, but it is to be understood that instead of the operating wheels 20, push buttons may be used so as to preset a desired reading or to increment or decrement it and to change the angular positions of the notches 13 of the first intermediate wheels 7.

What is claimed is:

1. A preset counter comprising
a casing, and
one or more counter units,
each counter unit having
a number wheel,
a first intermediate wheel in mesh with said number wheel,
a preset wheel,
a second intermediate wheel in mesh with said preset wheel,
locking means, and
a contact mechanism having a contact roller or a count-stop means,
said first intermediate wheel comprising a first wheel which is in engagement with said number wheel and whose rotation may be releasably arrested by said locking means and a second wheel which is disposed in opposed relationship with said second intermediate wheel and is resiliently connected through clutch means to said first wheel and formed with a notch, said second wheel being forcibly rotated when said first wheel is prevented from being rotated, and
arresting means for arresting said second intermediate wheel at a predetermined angular position and in the braked state when said second intermediate wheel remains stationary, said second wheel being rotated by the rotation of said second intermediate wheel but the rotation of said second wheel causing no rotation of said second intermediate wheel, each of said counter units being so arranged that when said notch and said contact roller are in line with each other, contacts are actuated so as to generate the signal which is transmitted to the exterior.

2. A preset counter comprising
a casing, and
one or more counter units
each counter unit having a number wheel which has a first gear, is loosely carried by a shaft which in turn is supported by said casing and has a plurality of numbers marked on the peripheral face, a preset wheel which has an operating wheel and a second gear formed coaxially of and integrally with said operating wheel, is loosely carried by a shaft which in turn is supported by said casing, and has a plurality of numbers marked in correspondence with the numbers marked on said number wheel, a second intermediate wheel which has a third gear in mesh with said second gear of said preset wheel and a fourth gear formed coaxially of and integrally with said third gear, and is loosely carried by a shaft which in turn is supported by said casing, a first intermediate wheel which has a first wheel having a fifth gear in mesh with said first gear of said number wheel and a second wheel which is coaxial with said first wheel and has a sixth gear which is in opposed relationship with said fourth gear of said second intermediate wheel and is formed integrally with said second wheel, said first intermediate wheel being loosely carried by a shaft which in turn is supported by said casing, said second wheel having a notch cut into the peripheral face thereof, said sixth gear being resiliently connected through clutch means to said fifth gear so that when the rotation of said fifth gear is prevented, said second wheel may be forcibly rotated with respect to said fifth gear, locking means for releasably locking said fifth gear of said first intermediate wheel, a contact mechanism or count-stop means with a contact roller, means for arresting said second intermediate wheel at a predetermined angular position and in the braked state when said second intermediate wheel remains stationary, the fourth gear of said second intermediate wheel and said sixth gear formed integrally with said second wheel being so positioned that the rotation of said fourth gear causes the rotation of said sixth gear but the rotation of said sixth gear will not cause the rotation of said fourth gear, each counter unit being so arranged that when said notch and said contact roller are in line with each other, contacts are actuated so as to generate the signal which in turn is transmitted to the exterior.

3. A preset counter as set forth in claim 2 wherein said fourth gear of said second intermediate wheel is a pin gear with a plurality of pins, and a V-shaped recess is formed between the adjacent pins.

4. A preset counter as set forth in claim 3 wherein when said pin gear is stationary, said V-shaped recess of said pin gear is opposite to said sixth gear of said first intermediate wheel and spaced apart therefrom by a predetermined distance.

5. A preset counter as set forth in claim 2 wherein said means for arresting said second intermediate wheel comprises a spring having elasticity and pressing said V-shaped side of said pin gear when said pin gear is stationary.

6. A preset counter as set forth in claim 2 wherein said casing is provided with a cover which may be selectively brought to an open position or to a closing position, and when said cover is opened said fifth gear of said first intermediate wheel is locked while when said cover is closed said fifth gear is released.

* * * * *